US012757058B2

(12) United States Patent
Liu et al.

(10) Patent No.: US 12,757,058 B2
(45) Date of Patent: Oct. 6, 2026

(54) DATA TRANSMISSION METHOD AND APPARATUS, DEVICE, AND STORAGE MEDIUM

(71) Applicant: CHINA TELECOM CORPORATION LIMITED, Beijing (CN)

(72) Inventors: Shengnan Liu, Beijing (CN); Zheng Jiang, Beijing (CN); Xiaoming She, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 296 days.

(21) Appl. No.: 18/294,372

(22) PCT Filed: Jul. 14, 2022

(86) PCT No.: PCT/CN2022/105662
§ 371 (c)(1),
(2) Date: Feb. 1, 2024

(87) PCT Pub. No.: WO2023/011131
PCT Pub. Date: Feb. 9, 2023

(65) Prior Publication Data

US 2024/0349137 A1 Oct. 17, 2024

(30) Foreign Application Priority Data

Aug. 2, 2021 (CN) ......................... 202110882804.9

(51) Int. Cl.
*H04W 28/02* (2009.01)
*H04W 28/08* (2023.01)
*H04W 36/00* (2009.01)

(52) U.S. Cl.
CPC ........... *H04W 28/02* (2013.01); *H04W 28/08* (2013.01); *H04W 36/0061* (2013.01); *H04W 36/0069* (2018.08)

(58) Field of Classification Search
CPC . H04W 28/02; H04W 28/08; H04W 36/0061; H04W 36/0069; H04W 36/362
See application file for complete search history.

(56) References Cited

U.S. PATENT DOCUMENTS

2021/0099926 A1 4/2021 Chen et al.
2021/0258852 A1* 8/2021 Selvaganapathy .. H04W 36/305
(Continued)

FOREIGN PATENT DOCUMENTS

CN 115589620 A * 1/2023 ............ H04W 36/00
EP 4266746 A1 * 10/2023 .......... H04W 36/362
(Continued)

OTHER PUBLICATIONS

Huawei et al. ""Discussion on support of conditional PS Cell change/addition"" 3GPP TSG-RAN WG3 Meeting #112-e, R2-2010125, Nov. 13, 2020 (Nov. 13, 2020), 8 pages.
(Continued)

*Primary Examiner* — Sujoy K Kundu
*Assistant Examiner* — Vladislav Y Agureyev
(74) *Attorney, Agent, or Firm* — Andrew M. Calderon; Calderon Safran & Wright P.C.

(57) ABSTRACT

The present disclosure relates to the technical field of communications, and provides a data transmission method and apparatus, a device, and a storage medium. The method includes: receiving first preset signaling sent by a terminal, the first preset signaling comprising conditional PScell addition/change (CPAC) executed indication information, and the CPAC executed indication information being used for indicating that the terminal executes a CPAC process; and when the CPAC process is a conditional PScell change (CPC) process, sending second preset signaling to a source secondary node, the second preset signaling comprising CPC executed indication information, and the CPC executed
(Continued)

indication information being used for indicating that the terminal executes the CPC process.

10 Claims, 8 Drawing Sheets

(56) References Cited

U.S. PATENT DOCUMENTS

| | | | | |
|---|---|---|---|---|
| 2022/0141915 | A1* | 5/2022 | Zhang | H04W 36/362 370/329 |
| 2022/0167233 | A1* | 5/2022 | Shi | H04W 36/00837 |
| 2022/0338089 | A1* | 10/2022 | Kim | H04W 36/34 |
| 2022/0369172 | A1* | 11/2022 | Hwang | H04W 36/0079 |
| 2022/0377626 | A1* | 11/2022 | Kim | H04W 76/27 |
| 2022/0400417 | A1* | 12/2022 | Zhang | H04W 24/08 |
| 2023/0060537 | A1* | 3/2023 | Da Silva | H04W 36/00837 |
| 2023/0086614 | A1* | 3/2023 | Kim | H04W 36/00838 370/331 |
| 2023/0109703 | A1* | 4/2023 | Sun | H04W 24/08 370/329 |
| 2023/0209425 | A1* | 6/2023 | Da Silva | H04W 36/08 370/331 |
| 2023/0217325 | A1* | 7/2023 | Kim | H04W 36/00695 370/331 |
| 2023/0239751 | A1* | 7/2023 | Kim | H04W 36/00698 370/331 |
| 2023/0262540 | A1* | 8/2023 | Kim | H04W 76/19 370/216 |
| 2023/0362750 | A1* | 11/2023 | Hu | H04W 36/0061 |
| 2023/0370936 | A1* | 11/2023 | Eklöf | H04W 36/00698 |
| 2024/0008144 | A1* | 1/2024 | Van Der Velde | H04W 76/15 |
| 2024/0056902 | A1* | 2/2024 | Zhang | H04W 36/0007 |
| 2024/0172057 | A1* | 5/2024 | Hwang | H04W 36/00835 |
| 2024/0187956 | A1* | 6/2024 | Hwang | H04W 36/362 |
| 2024/0276320 | A1* | 8/2024 | Eklöf | H04W 36/0069 |
| 2025/0008389 | A1* | 1/2025 | Zhang | H04W 36/0069 |
| 2025/0097788 | A1* | 3/2025 | Watanabe | H04W 36/0064 |

FOREIGN PATENT DOCUMENTS

| | | | | | |
|---|---|---|---|---|---|
| KR | 20220126579 | A | * | 9/2022 | H04W 36/362 |
| WO | 2021066567 | A1 | | 4/2021 | |
| WO | 2021067236 | A1 | | 4/2021 | |
| WO | 2021086254 | A1 | | 5/2021 | |
| WO | WO-2021091342 | A1 | * | 5/2021 | H04W 36/0058 |
| WO | 2021109389 | A1 | | 6/2021 | |
| WO | 2021062679 | A1 | | 8/2021 | |
| WO | WO-2021162507 | A1 | * | 8/2021 | H04W 76/27 |
| WO | WO-2021172964 | A1 | * | 9/2021 | H04W 76/15 |
| WO | WO-2021194134 | A1 | * | 9/2021 | H04W 36/362 |
| WO | WO-2021234633 | A1 | * | 11/2021 | H04W 36/38 |
| WO | WO-2021251625 | A1 | * | 12/2021 | H04W 36/00698 |
| WO | WO-2021251685 | A1 | * | 12/2021 | H04W 36/00695 |

OTHER PUBLICATIONS

Huawei. ""Summary of Offline Discussion on MRDC2-PSCell_Change_Addition"" 3GPP TSG-RAN WG3 #110-e, RJ-206893, Jun. 11, 2020 (Jun. 11, 2020), 22 pages.

Nokia et al. ""On Rel-17 Basic CPAC Procedures"" 3GPP TSG-RAN WG2 Meeting #113 Electronic, R2-2100531, Feb. 5, 2021 (Feb. 5, 2021), 3 pages.

CATT. ""Consideration on SN Initiated Conditional SN Change Procedure"" 3GPP TSG-RAN3 Meeting #106, RJ-196726, Nov. 22, 2019 (Nov. 22, 2019), 5 pages.

Qualcomm Inc. ""CPA and MN initiated Inter-SN CPC procedures: preparation, execution, and data forwarding"", 3GPP TSG-RAN WG3 Meeting #112-e, RJ-211757, May 28, 2021 (May 28, 2021), 7 pages.

International Search Report dated Oct. 10, 2022 in International Application No. PCT/CN2022/105662 and it's English Translation, 7 pages.

Extended European Search Report dated Sep. 7, 2025 in EP Application No. 22851845.2-1206 / 4383810 PCT/CN2022105662, 12 pages.

International Search Report and Written Opinion issued on Feb. 9, 2022 in corresponding Application No. PCT/CN2021/136748; 10 pages; mailed Oct. 10, 2022.

Qualcomm Inc., "CPA and MN initiated Inter-SN CPC procedures: preparation, execution, and data forwarding", 3GPP TSG-RAN WG3 Meeting #112-e, R3-211757,May 28, 2021 (May 28, 2021).

Nokia et al., "On Rel-17 Basic CPAC Procedures", 3GPP TSG-RAN WG2 Meeting #113 Electronic, R2-2100531,Feb. 5, 2021 (Feb. 5, 2021).

CATT, "Consideration on SN Initiated Conditional SN Change Procedure", 3GPP TSG-RAN3 Meeting #106, R3-196726,Nov. 22, 2019 (Nov. 22, 2019).

Huawei et al., "Discussion on support of conditional PSCell change/addition", 3GPP TSG-RAN WG3 Meeting #112-e, R2-2010125,Nov. 13, 2020 (Nov. 13, 2020).

Huawei, "Summary of Offline Discussion on MRDC2-PSCell_Change_Addition", 3GPP TSG-RAN WG3 #110-e, R3-206893,Jun. 11, 2020 (Jun. 11, 2020).

Japanese Office Action dated Mar. 21, 2025 in JP Application No. 2024-506796 with Google Machine Translation, 6 pages.

Huawei, "Discussion on conditional PScell change", 3GPP TSG-RAN WG2 Meeting #108 R2-1915848 Reno, Nevada, USA, Nov. 18-22, 2019, 4 Pages.

Chinese Office Action dated Jul. 6, 2024 in CN Application No. 202110882804.9 with Google Machine Translation, 18 pages.

Huawei, "(TP to CPAC TS 37.340 BL CR) Consideration on conditional PSCell change/addition", 3GPP TSG-RAN WG3 Meeting #112-e R3-211913 E-meeting, May 17-28, 2021, 26 Pages.

* cited by examiner

DATA TRANSMISSION METHOD AND APPARATUS, DEVICE, AND STORAGE MEDIUM

CROSS-REFERENCE TO RELATED APPLICATIONS

The present application is based on and claims the priority to the Chinese Patent Application No. 202110882804.9 filed on Aug. 2, 2021, the disclosure of which is incorporated by reference herein in its entirety.

TECHNICAL FIELD

The present disclosure relates to the technical field of communications, and specifically, to a data transmission method and apparatus, a device, and a readable storage medium.

BACKGROUND

With the application of an NSA (Non-Standalone; Non-Standalone refers to a networking architecture in which 4G base stations and 5G base stations coexist at wireless side and a core network employs a 4G core network) architecture in a practical deployment scenario of 5th generation mobile communication technology (5G for short), 4G and 5G networks will long-term coexist for some time to come, and applications of various multi-RAT (Radio Access Technology)-dual connectivity (MR-DC) technologies will effectively improve network coverage and system capacity, while ensuring quality of service for users and improving network spectrum utilization.

An important research in MR-DC enhancement technology is to support a conditional PScell (Primary Secondary Cell) addition/change (CPAC) process. A late data forwarding mechanism is supported in the CPAC process, and according to the mechanism, data forwarding is performed after a terminal (also called user equipment (UE)) is connected with a target secondary node (SN). However, in the CPAC process, triggering the connection of the UE with the target SN is initiated by the UE, so that a time for starting data forwarding of a master node (MN) or a source SN that triggers the CPAC process cannot be properly matched with a time for starting the connection of the UE with the target SN, and the improper time for triggering data forwarding may cause the occurrence of the problem of UE data interruption or network cache overload. The term "late data forwarding" is herein named for distinction from an early data forwarding mechanism, and may be practically named as in time data forwarding, on time data forwarding, etc., which all refer to the mechanism where the source node performs data forwarding after the UE successfully selects the target secondary node.

As described above, how to trigger a data forwarding procedure at a proper time has become an urgent problem to be solved.

The above information disclosed in the BACKGROUND is only for enhancement of understanding of the background of the present disclosure, and therefore it can contain information that does not form prior art known to one of ordinary skill in the art.

SUMMARY

Other features and advantages of the present disclosure will become apparent from the following detailed description, or be partially learned by practice of the present disclosure.

According to an aspect of the present disclosure, there is provided a data transmission method applied to a master node, comprising: receiving first preset signaling sent from a terminal, wherein the first preset signaling comprises conditional PScell addition/change (CPAC) executed indication information for indicating that the terminal has executed a CPAC process; and sending second preset signaling to a source secondary node in a case that the CPAC process is a conditional PScell change (CPC) process, wherein the second preset signaling comprises CPC executed indication information for indicating that the terminal has executed the CPC process.

According to some embodiments of the present disclosure, the first preset signaling is radio resource control (RRC) signaling.

According to some embodiments of the present disclosure, the second preset signaling is at least one of existing X2/Xn signaling, newly added X2 signaling, Xn-U address indication signaling, or newly added Xn signaling.

According to some embodiments of the present disclosure, the second preset signaling is the newly added X2 signaling, which is at least one of conditional PScell change notification signaling, conditional PScell change indication signaling, or conditional PScell change completion signaling.

According to some embodiments of the present disclosure, the second preset signaling is the newly added Xn signaling, which is at least one of conditional PScell change notification signaling, conditional PScell change indication signaling, or conditional PScell change completion signaling.

According to some embodiments of the present disclosure, the first preset signaling further comprises information related to the CPAC executed indication information, wherein the information related to the CPAC executed indication information in the first preset signaling comprises an identification of a target cell of a target secondary node selected by the terminal in the CPAC process; and the method further comprises: obtaining a data forwarding address corresponding to the target cell from obtained data forwarding addresses according to the identification of the target cell, wherein the second preset signaling comprises information related to the CPC executed indication information, and the information related to the CPC executed indication information in the second preset signaling comprises the identification of the target cell and the data forwarding address corresponding to the target cell.

According to some embodiments of the present disclosure, the method further comprises: receiving to-be-transmitted data corresponding to the terminal and sequence number status transfer signaling corresponding to the to-be-transmitted data which are sent, in a late data forwarding procedure, from the source secondary node triggering the late data forwarding procedure based on the CPC executed indication information, as well as the data forwarding address corresponding to the target cell which is sent from the source secondary node based on the information related to the CPC executed indication information; and sending the to-be-transmitted data and the sequence number status transfer signaling corresponding to the to-be-transmitted data to the target secondary node according to the data forwarding address corresponding to the target cell.

According to some embodiments of the present disclosure, in a case that the CPAC process is a conditional PScell addition (CPA) process, the first preset signaling further comprises information related to the CPAC executed indication information, wherein the information related to the CPAC executed indication information in the first preset signaling comprises an identification of a target cell of a target secondary node selected by the terminal in the CPA process; and the method further comprises: obtaining a data forwarding address corresponding to the target cell from obtained data forwarding addresses according to the identification of the target cell; and in response to receiving the first preset signaling, triggering a late data forwarding procedure based on the CPAC executed indication information, and sending to-be-transmitted data corresponding to the terminal and sequence number status transfer signaling corresponding to the to-be-transmitted data to the target secondary node according to the data forwarding address corresponding to the target cell in the late data forwarding procedure.

According to some embodiments of the present disclosure, the first preset signaling is at least one of multiple radio access technologies double connection signaling of uplink information transfer, radio resource control reconfiguration completion signaling, or radio resource control connection reconfiguration completion signaling.

According to a further aspect of the present disclosure, there is provided a data transmission method applied to a terminal, comprising: sending first preset signaling to a master node, wherein the first preset signaling comprises conditional PScell addition/change (CPAC) executed indication information for indicating that the terminal has executed a CPAC process, so that the master node, in a case that the CPAC process is a conditional PScell change CPC process, sends second preset signaling to a source secondary node, wherein the second preset signaling comprised CPC executed indication information, and the CPC executed indication information is used for indicating that the terminal has executed the CPC process.

According to some embodiments of the present disclosure, the first preset signaling is radio resource control RRC signaling.

According to some embodiments of the present disclosure, the second preset signaling is at least one of existing X2/Xn signaling, newly added X2 signaling, Xn-U address indication signaling, or newly added Xn signaling.

According to some embodiments of the present disclosure, the second preset signaling is the newly added X2 signaling, which is at least one of conditional PScell change notification signaling, conditional PScell change indication signaling, or conditional PScell change completion signaling.

According to some embodiments of the present disclosure, the second preset signaling is the newly added Xn signaling, which is at least one of conditional PScell change notification signaling, conditional PScell change indication signaling, or conditional PScell change completion signaling.

According to some embodiments of the present disclosure, the first preset signaling further comprises information related to the CPAC executed indication information, the information related to the CPAC executed indication information in the first preset signaling comprising an identification of a target cell of a target secondary node selected by the terminal in the CPAC process; the method further comprises: sending the first preset signaling to the master node, so that the master node obtains a data forwarding address corresponding to the target cell from obtained data forwarding addresses according to the identification of the target cell; and the second preset signaling comprises information related to the CPC executed indication information, the information related to the CPC executed indication information in the second preset signaling comprising the identification of the target cell and the data forwarding address corresponding to the target cell.

According to some embodiments of the present disclosure, the first preset signaling is multiple radio access technologies double connection signaling of uplink information transfer.

According to a further aspect of the present disclosure, there is provided a data transmission method applied to a secondary node, the method comprising: receiving second preset signaling sent from a master node according to conditional PScell addition/change (CPAC) executed indication information, wherein: the second preset signaling comprises CPC executed indication information, which is used for indicating that a terminal has executed a CPC process, and the second preset signaling is generated by the master node according to the CPAC executed indication information in first preset signaling sent by the terminal in a case that a conditional PScell addition/change (CPAC) process that the terminal has executed is the CPC process, the first preset signaling comprising the CPAC executed indication information, and the CPAC executed indication information being used for indicating that the terminal has executed the CPAC process.

According to some embodiments of the present disclosure, the first preset signaling is radio resource control (RRC) signaling.

According to some embodiments of the present disclosure, the second preset signaling is at least one of existing X2/Xn signaling, newly added X2 signaling, Xn-U address indication signaling, or newly added Xn signaling.

According to some embodiments of the present disclosure, the second preset signaling is the newly added X2 signaling, which is at least one of conditional PScell change notification signaling, conditional PScell change indication signaling, or conditional PScell change completion signaling.

According to some embodiments of the present disclosure, the second preset signaling is the newly added Xn signaling, which is at least one of conditional PScell change notification signaling, conditional PScell change indication signaling, or conditional PScell change completion signaling.

According to some embodiments of the present disclosure, the first preset signaling further comprises information related to the CPAC executed indication information, the information related to the CPAC executed indication information in the first preset signaling comprising an identification of a target cell of a target secondary node selected by the terminal in the CPAC process; and the second preset signaling comprises information related to the CPC executed indication information, the information related to the CPC executed indication information in the second preset signaling comprising the identification of the target cell and a data forwarding address corresponding to the target cell, the data forwarding address corresponding to the target cell being obtained by the master node from obtained data forwarding addresses according to the identification of the target cell.

According to some embodiments of the present disclosure, the method further comprises: triggering a late data forwarding procedure based on the CPC executed indication information, sending to-be-transmitted data corresponding to the terminal and sequence number status transfer signaling corresponding to the to-be-transmitted data to the master node in the late data forwarding procedure, and sending the data forwarding address corresponding to the target cell to the master node based on the information related to the CPC executed indication information, so that the master node sends the to-be-transmitted data and the Sequence number status transfer signaling corresponding to the to-be-transmitted data to the target secondary node according to the data forwarding address corresponding to the target cell.

According to some embodiments of the present disclosure, the first preset signaling is at least one of double connection signaling of uplink information transfer multiple radio access technologies, radio resource control reconfiguration completion signaling, or radio resource control connection reconfiguration completion signaling.

According to yet another aspect of the present disclosure, there is provided a data transmission apparatus applied to a master node, the apparatus comprising: a first preset signaling receiving module configured to receive first preset signaling sent by a terminal, wherein the first preset signaling comprises conditional PScell addition/change (CPAC) executed indication information, wherein the CPAC executed indication information is used for indicating that the terminal has executed a CPAC process; and a second preset signaling sending module configured to, in a case that the CPAC process is a conditional PScell change (CPC) process, send second preset signaling to a source secondary node, wherein the second preset signaling comprised CPC executed indication information, which is used for indicating that the terminal has executed the CPC process.

According to some embodiments of the present disclosure, the first preset signaling is radio resource control (RRC) signaling.

According to some embodiments of the present disclosure, the second preset signaling is at least one of existing X2/Xn signaling, newly added X2 signaling, Xn-U address indication signaling, or newly added Xn signaling.

According to some embodiments of the present disclosure, the second preset signaling is the newly added X2 signaling, which is at least one of conditional PScell change notification signaling, conditional PScell change indication signaling, or conditional PScell change completion signaling.

According to some embodiments of the present disclosure, the second preset signaling is the newly added Xn signaling, which is at least one of conditional PScell change notification signaling, conditional PScell change indication signaling, or conditional PScell change completion signaling.

According to some embodiments of the present disclosure, the first preset signaling further comprises information related to the CPAC executed indication information, the information related to the CPAC executed indication information in the first preset signaling comprising an identification of a target cell of a target secondary node selected by the terminal in the CPAC process; the apparatus further comprises: a data forwarding address obtaining module configured to obtain a data forwarding address corresponding to the target cell from obtained data forwarding addresses according to the identification of the target cell; and the second preset signaling comprises information related to the CPC executed indication information, the information related to the CPC executed indication information in the second preset signaling comprising the identification of the target cell and the data forwarding address corresponding to the target cell.

According to some embodiments of the present disclosure, the apparatus further comprises: a data forwarding module configured to receive to-be-transmitted data corresponding to the terminal and sequence number status transfer signaling corresponding to the to-be-transmitted data which are sent, in a late data forwarding procedure, from the source secondary node triggering the late data forwarding procedure based on the CPC executed indication information, as well as the data forwarding address corresponding to the target cell which is sent from the source secondary node based on the information related to the CPC executed indication information; and send the to-be-transmitted data and the sequence number status transfer signaling corresponding to the to-be-transmitted data to the target secondary node according to the data forwarding address corresponding to the target cell.

According to some embodiments of the present disclosure, when the CPAC process is a conditional PScell addition CPA process, the first preset signaling further comprises information related to the CPAC executed indication information, the information related to the CPAC executed indication information in the first preset signaling comprising an identification of a target cell of a target secondary node selected by the terminal in the CPA process; the apparatus further comprises: a data forwarding address obtaining module configured to obtain a data forwarding address corresponding to the target cell from obtained data forwarding addresses according to the identification of the target cell; the apparatus further comprises: a data sending module configured to, in response to receiving the first preset signaling, trigger a late data forwarding procedure based on the CPAC executed indication information, and send to-be-transmitted data corresponding to the terminal and Sequence number status transfer signaling corresponding to the to-be-transmitted data to the target secondary node according to the data forwarding address corresponding to the target cell in the late data forwarding procedure.

According to some embodiments of the present disclosure, the first preset signaling is at least one of multiple radio access technologies double connection signaling of uplink information transfer, radio resource control reconfiguration completion signaling, or radio resource control connection reconfiguration completion signaling.

According to another aspect of the present disclosure, there is provided a data transmission apparatus applied to a terminal, the apparatus comprising: a first preset signaling sending module configured to send first preset signaling to a master node, wherein the first preset signaling comprises conditional PScell addition/change CPAC executed indication information, the CPAC executed indication information being used for indicating that the terminal has executed a CPAC process, so that the master node, when the CPAC process is a conditional PScell change CPC process, sends second preset signaling to a source secondary node, the second preset signaling comprising CPC executed indication information, and the CPC executed indication information being used for indicating that the terminal has executed the CPC process.

According to some embodiments of the present disclosure, the first preset signaling is radio resource control (RRC) signaling.

According to some embodiments of the present disclosure, the second preset signaling is at least one of existing X2/Xn signaling, newly added X2 signaling, Xn-U address indication signaling, or newly added Xn signaling.

According to some embodiments of the present disclosure, the second preset signaling is the newly added X2 signaling, which is at least one of conditional PScell change notification signaling, conditional PScell change indication signaling, or conditional PScell change completion signaling.

According to some embodiments of the present disclosure, the second preset signaling is the newly added Xn signaling, which is at least one of conditional PScell change notification signaling, conditional PScell change indication signaling, or conditional PScell change completion signaling.

According to some embodiments of the present disclosure, the first preset signaling further comprises information related to the CPAC executed indication information, the information related to the CPAC executed indication information in the first preset signaling comprising an identification of a target cell of a target secondary node selected by the terminal in the CPAC process; the first preset signaling sending module is further configured to send the first preset signaling to the master node, so that the master node obtains a data forwarding address corresponding to the target cell from obtained data forwarding addresses according to the identification of the target cell; and the second preset signaling comprises information related to the CPC executed indication information, the information related to the CPC executed indication information in the second preset signaling comprising the identification of the target cell and the data forwarding address corresponding to the target cell.

According to some embodiments of the present disclosure, the first preset signaling is at least one of multiple radio access technologies double connection signaling of uplink information transfer, radio resource control reconfiguration completion signaling, or radio resource control connection reconfiguration completion signaling.

According to another aspect of the present disclosure, there is provided a data transmission apparatus applied to a secondary node, the apparatus comprising: a second preset signaling receiving module configured to receive second preset signaling sent by a master node according to conditional PScell addition/change CPAC executed indication information, the second preset signaling comprising CPC executed indication information, the CPC executed indication information being used for indicating that a terminal has executed a CPC process, the second preset signaling being generated by the master node according to the CPAC executed indication information in first preset signaling sent by the terminal when a conditional PScell addition/change CPAC process that the terminal has executed is the CPC process, the first preset signaling comprising the CPAC executed indication information, and the CPAC executed indication information being used for indicating that the terminal has executed the CPAC process.

According to some embodiments of the present disclosure, the first preset signaling is radio resource control (RRC) signaling.

According to some embodiments of the present disclosure, the second preset signaling is at least one of existing X2/Xn signaling, newly added X2 signaling, Xn-U address indication signaling, or newly added Xn signaling.

According to some embodiments of the present disclosure, the second preset signaling is the newly added X2 signaling, which is at least one of conditional PScell change notification signaling, conditional PScell change indication signaling, or conditional PScell change completion signaling.

According to some embodiments of the present disclosure, the second preset signaling is the newly added Xn signaling, which is at least one of conditional PScell change notification signaling, conditional PScell change indication signaling, or conditional PScell change completion signaling.

According to some embodiments of the present disclosure, the first preset signaling further comprises information related to the CPAC executed indication information, the information related to the CPAC executed indication information in the first preset signaling comprising an identification of a target cell of a target secondary node selected by the terminal in the CPAC process; and the second preset signaling comprises information related to the CPC executed indication information, the information related to the CPC executed indication information in the second preset signaling comprising the identification of the target cell and a data forwarding address corresponding to the target cell, the data forwarding address corresponding to the target cell being obtained by the master node from obtained data forwarding addresses according to the identification of the target cell.

According to some embodiments of the present disclosure, the apparatus further comprises: a data sending module configured to trigger a late data forwarding procedure based on the CPC executed indication information, send to-be-transmitted data corresponding to the terminal and sequence number status transfer signaling corresponding to the to-be-transmitted data to the master node in the late data forwarding procedure, and send the data forwarding address corresponding to the target cell to the master node based on the information related to the CPC executed indication information, so that the master node sends the to-be-transmitted data and the Sequence number status transfer signaling corresponding to the to-be-transmitted data to the target secondary node according to the data forwarding address corresponding to the target cell.

According to some embodiments of the present disclosure, the first preset signaling is at least one of multiple radio access technologies double connection signaling of uplink information transfer, radio resource control reconfiguration completion signaling, or radio resource control connection reconfiguration completion signaling.

According to a further aspect of the present disclosure, there is provided a device, comprising: a memory, a processor, and executable instructions stored in the memory and executable in the processor, wherein the processor, when executing the executable instructions, implements any of the methods described above.

According to a further aspect of the present disclosure, there is provided a computer-readable storage medium stored computer-executable instructions, which, when executed by a processor, implement any of the methods described above.

It is to be understood that both the general description above and the detailed description hereinafter are exemplary only and cannot limit the present disclosure.

BRIEF DESCRIPTION OF THE DRAWINGS

The above and other objectives, features and advantages of the present disclosure will become more apparent from the detailed description of exemplary embodiments thereof with reference to the accompanying drawings.

DETAILED DESCRIPTION

Figure 1:
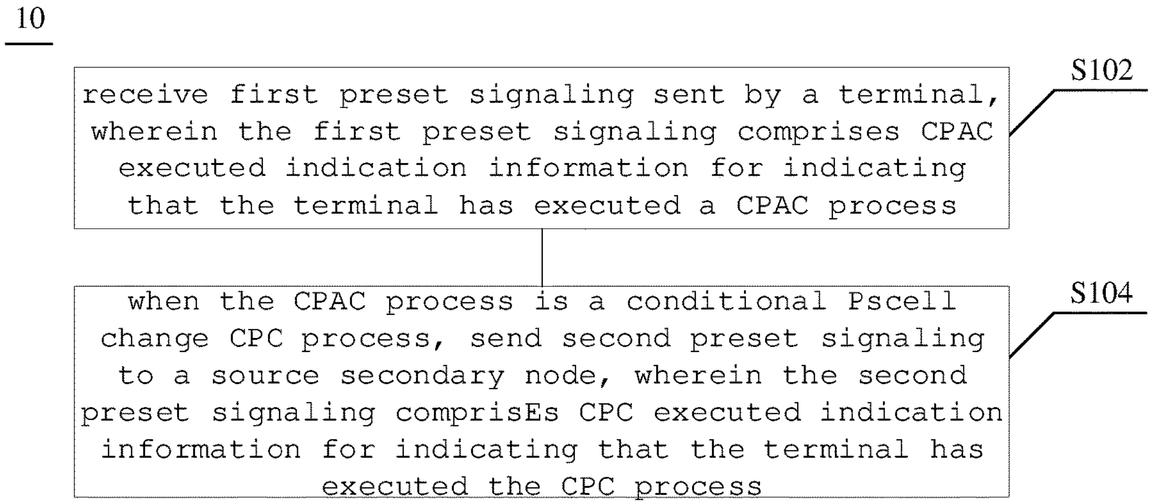
FIG. 1 shows a flow diagram of a data transmission method in an embodiment of the present disclosure.

Example embodiments will now be described more fully with reference to the accompanying drawings. The example embodiments can, however, be implemented in multiple forms and should not be construed as limited to examples set forth herein; rather, these embodiments are provided so that this disclosure will be thorough and complete, and the concept of the example embodiments will be fully conveyed to those skilled in the art. The drawings are merely schematic illustrations of the present disclosure and are not necessarily drawn to scale. Same reference numerals in the drawings denote same or similar parts, and thus a repetitive description thereof will be omitted.

Furthermore, described features, structures, or characteristics may be combined in any suitable manner in one or more embodiments. In the following description, numerous specific details are provided, thereby giving a thorough understanding of the embodiments of the present disclosure. Those skilled in the art will recognize, however, that the technical solutions of the present disclosure can be practiced with one or more of the specific details omitted, or other methods, apparatus, steps, etc. can be employed. In other cases, well-known structures, methods, apparatuses, implementations, or operations are not shown or described in detail to avoid distraction and make various aspects of the present disclosure obscured.

Furthermore, the terms "first," "second," and the like are used for descriptive purposes only and are not to be construed as indicating or implying relative importance or implicitly showing the number of indicated technical features. Thus, a feature defined with "first" or "second" can explicitly or implicitly include one or more of the feature. In the description of the present disclosure, "a plurality" means at least two, e.g., two, three, etc., unless explicitly defined otherwise. The symbol "/" generally indicates that former and latter associated objects are in an "or" relationship.

In this disclosure, unless expressly specified or defined otherwise, terms such as "connection" are to be construed broadly, e.g., it can be electrical connection or can be mutual communication; and can be direct connection or indirect connection through an intermediate medium. For one of ordinary skill in the art, the specific meanings of the above terms in the present disclosure can be understood according to a specific case.

As described above, one important research in the MR-DC enhancement technology is to support a CPAC procedure, which aims to improve a success rate of PScell addition/change, with a core idea that a network configures a UE to perform the CPAC procedure through radio resource control (RRC) signaling, and according to quality of received signals of surrounding candidate SN cells, when a cell of a certain candidate SN meets a configuration threshold, the UE initiates a synchronization process with the SN, without the need to report a measurement report to the network, thereby effectively improving the success rate of the PScell addition/change procedure.

When one of the following procedures occurs in the network: (1) a conditional PScell addition (CPA) procedure, (2) an MN-triggered conditional inter SN PScell change procedure (inter SN PScell change refers to a change in the PScell from a cell of an SN to a cell of another SN, and this disclosure is described by taking this case as an example, and a conditional PScell change (CPC) procedure hereinafter falls into this case unless otherwise stated), (3) an SN-triggered conditional inter SN PScell change procedure, if the network decides to use the traditional data forwarding mechanism (i.e., the late data forwarding mechanism), data forwarding using the data mechanism is performed after the UE is connected with a target SN.

However, since triggering the connection of the UE with the target SN in the CPAC process is initiated by the UE, a time for a master node (MN) or a source SN that triggers the CPAC process starting data forwarding cannot be properly matched with a time for the connection of the UE with the target SN, and the improper time for triggering data forwarding may cause the occurrence of the problem of UE data interruption or network cache overload.

An objective of the present disclosure is to provide a data transmission method and apparatus, a device, and a readable storage medium, which overcome the problem of data interruption or network cache overload that may be caused by the improper time for triggering data forwarding in the CPAC process at least to a certain extent.

According to the data transmission method provided in some embodiments of the present disclosure, by receiving first preset signaling comprising CPAC executed indication information used for indicating that a terminal has executed a CPAC process, which is sent by the terminal, and when the CPAC process is a conditional PScell change CPC process, sending, to a source secondary node, second preset signaling comprising CPC executed indication information used for indicating that the terminal has executed the CPC process, a late data forwarding procedure is started after an indication from a terminal to select a target secondary node is received, which makes the time for triggering the late data forwarding procedure more proper, thereby avoiding the technical problem of UE data interruption or network cache overload that may be caused by an improper time for triggering late data forwarding.

Therefore, some embodiments of the present disclosure provide a data transmission method, where by receiving first preset signaling comprising CPAC executed indication information used for indicating that a terminal has executed a CPAC process, which is sent by the terminal, and when the CPAC process is a conditional PScell change CPC process, sending, to a source secondary node, second preset signaling comprising CPC executed indication information used for indicating that the terminal has executed the CPC process, the method makes the time for triggering the data forwarding procedure more proper, thereby avoiding the technical problem of UE data interruption or network cache overload that may be caused by an improper time for triggering data forwarding.

FIG. 1 is a flow diagram of a data transmission method shown according to an exemplary embodiment. The method shown in FIG. 1 can be applied, for example, to a master node in a dual connectivity network, which can be a master node in a 5G multi connectivity (multi-RAT (Radio Access Technology) dual connectivity (MR-DC), which is multi connectivity for short) architecture network, for example.

Referring to FIG. 1, the method 10 provided in the embodiment of the present disclosure may comprise the following steps.

In step S102, first preset signaling sent by a terminal is received, the first preset signaling comprising CPAC executed indication information, wherein the CPAC executed indication information is used for indicating that the terminal has executed a CPAC process. Therefore, according to the terminal having executed the CPAC process that the CPAC executed indication information indicates, a late data forwarding procedure is performed.

In some embodiments, for example, the first preset signaling can be RRC signaling.

In some embodiments, for example, the first preset signaling is at least one of multi-RAT (Radio Access Technology) dual connectivity (ULInformationTransferMRDC) signaling of uplink information transfer, radio resource control reconfiguration complete (RRCReconfigurationComplete) signaling, or radio resource control connection reconfiguration complete (RRCConnectionReconfigurationComplete) signaling.

In some embodiments, for example, the CPAC executed indication information can be a CPAC executed cell in the ULInformationTransferMRDC signaling (or RRCReconfigurationComplete, RRCConnectionReconfigurationComplete), or a sub-cell of another cell, or may be only the signaling itself (i.e., the receiving of the signaling indicates that the terminal has executed the CPAC procedure). After the network completes a CPAC preparation phase, when the UE is connected with a target SN (i.e. performs synchronization and random access processes to a candidate SN meeting an indicator threshold condition), the UE can, through the RRC signaling, indicate to the MN that it has executed the CPAC process, so that this information may be carried through the ULInformationTransferMRDC signaling, for example, a CPAC executed sub-cell can be newly added to the existing ULInformationTransferMRDC, for indicating to the MN that the UE has currently selected connection with the target SN.

In some embodiments, the first preset signaling further comprises information related to the CPAC executed indication information, the information related to the CPAC executed indication information in the first preset signaling comprising an identification of a target cell of a target secondary node selected by the terminal in the CPAC process. When the UE informs the MN through the RRC signaling that the CPAC has been executed, it can inform the MN of the identification of the target cell together through the RRC signaling, so that the MN or the source SN obtains a corresponding data forwarding address for data forwarding based on the identification of the target cell, wherein reference can be made to FIGS. 2 to 5 for the specific implementation.

In step S104, when the CPAC process is a conditional Pscell change CPC process, second preset signaling is sent to a source secondary node, the second preset signaling comprising CPC executed indication information, and the CPC executed indication information being used for indicating that the terminal has executed the CPC process.

In some embodiments, the second preset signaling is at least one of existing X2/Xn signaling, newly added X2 (X2AP) signaling, Xn-U address indication signaling, or newly added Xn (XnAP) signaling.

In some embodiments, the second preset signaling is the newly added X2 signaling, which is at least one of conditional PScell change notification signaling, conditional PScell change indication signaling, or conditional PScell change complete signaling.

In some embodiments, the second preset signaling is the newly added Xn signaling, which is at least one of conditional PScell change notification signaling, conditional PScell change indication signaling, or conditional PScell change completion signaling.

Figure 2:
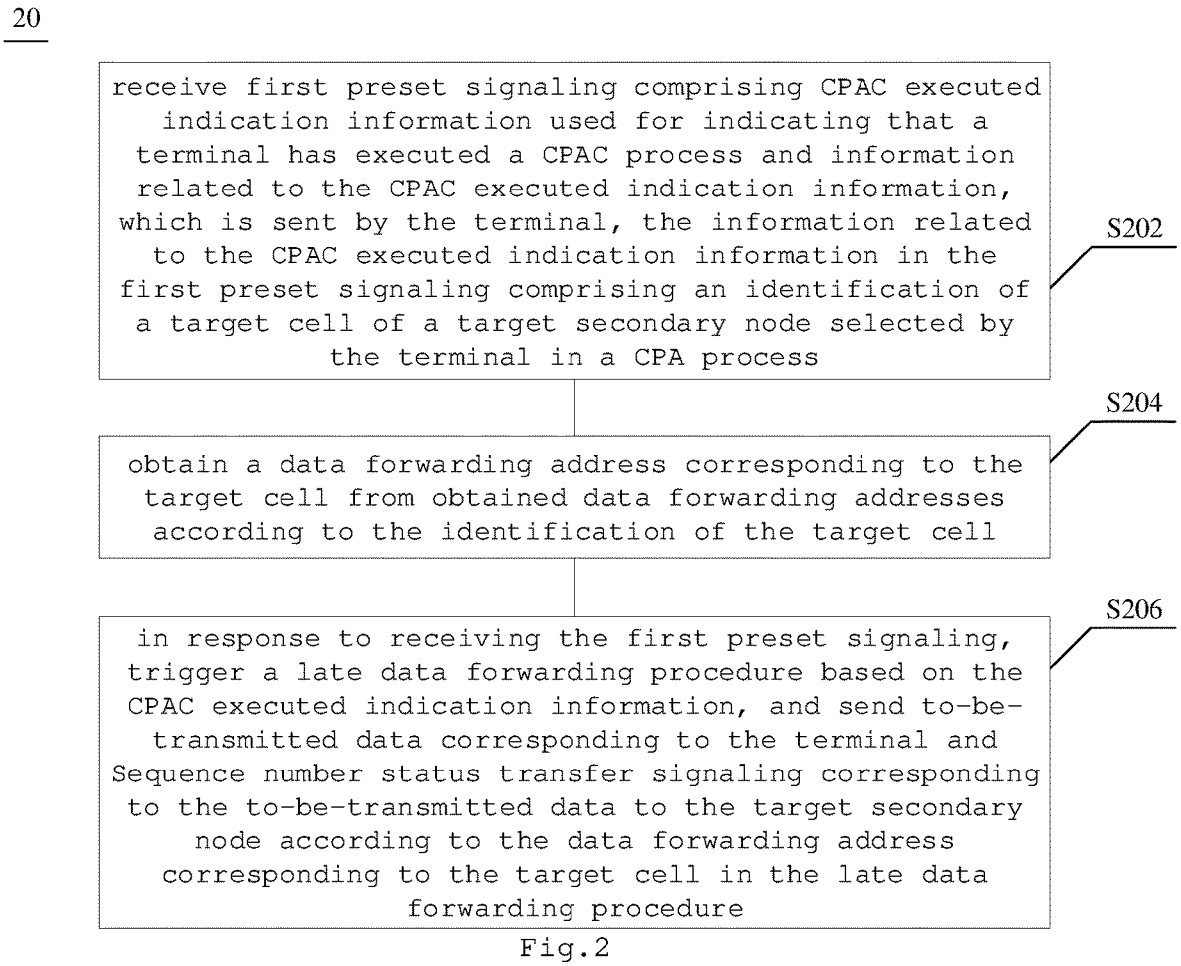
FIG. 2 shows a flow diagram of another data transmission method in an embodiment of the present disclosure.
Figure 3:
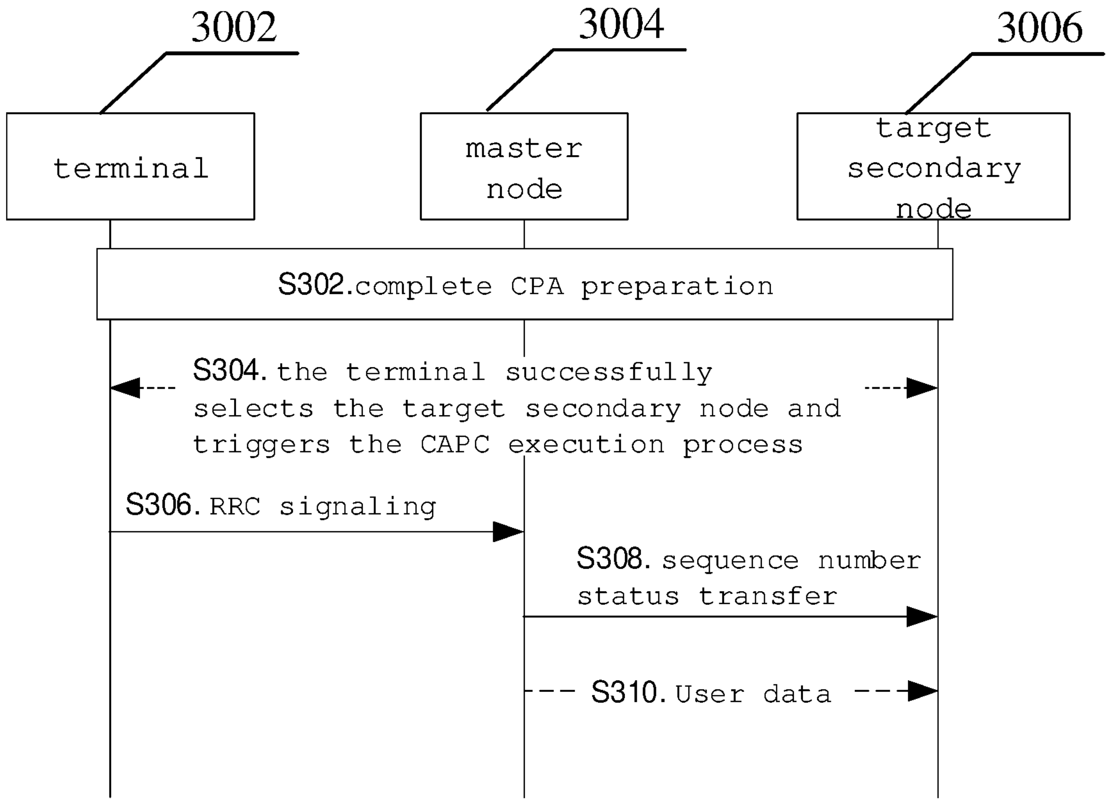
FIG. 3 is a schematic diagram of information interaction of a data forwarding process in a case of CPA shown in FIG. 2.

In some embodiments, for example, when the CPAC process is a CPA process, the MN, after receiving the RRC signaling of the UE including the CPAC executed indication information, directly starts a data forwarding procedure, to forward, to the target SN, to-be-transmitted data, for example, user data, wherein reference can be made to FIG. 2 and FIG. 3 for the specific implementation.

In some embodiments, for example, when the CPAC process is a CPC process, the MN can, after receiving the RRC signaling of the UE including the CPAC executed indication information, forward the CPAC executed indication information to the source SN through the second preset signaling, and the source SN, after receiving the CPC executed indication information therein, sends user data and sequence number (SN) status transfer signaling corresponding to the data to the MN, the Sequence number status transfer signaling being used for transmitting an uplink/downlink packet data convergence protocol (PDCP) sequence number (SN) and a hyper frame number (HFN) status in one data handover process in the dual connectivity system. After receiving the user data and the Sequence number status transfer signaling, the MN, as a forwarding node, forwards the user data and the Sequence number status transfer signaling to the target SN, thereby implementing data forwarding, wherein reference can be made to FIG. 4 and FIG. 5 for the specific implementation.

Figure 4:
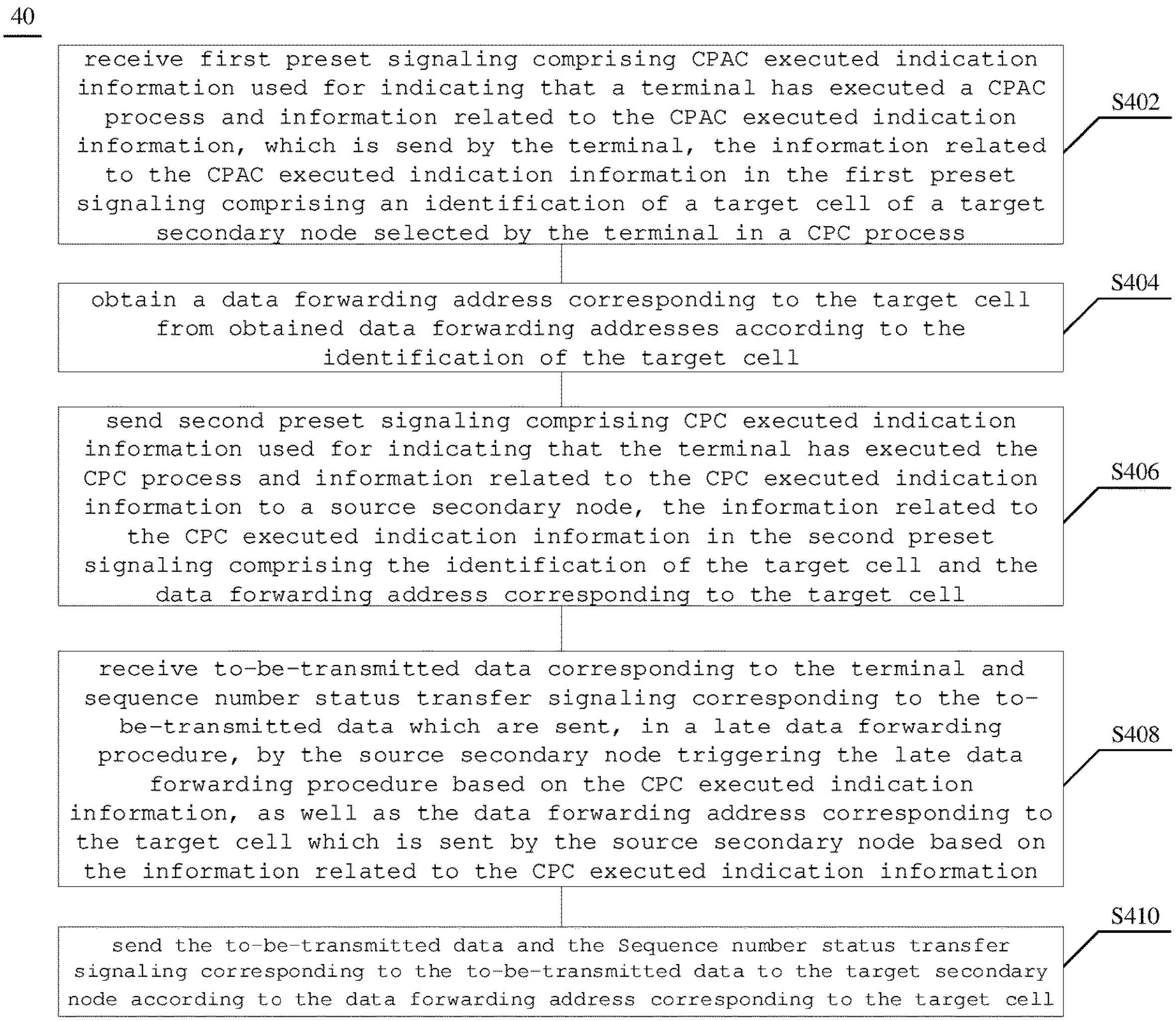
FIG. 4 shows a flow diagram of a further data transmission method in an embodiment of the present disclosure.
Figure 5:
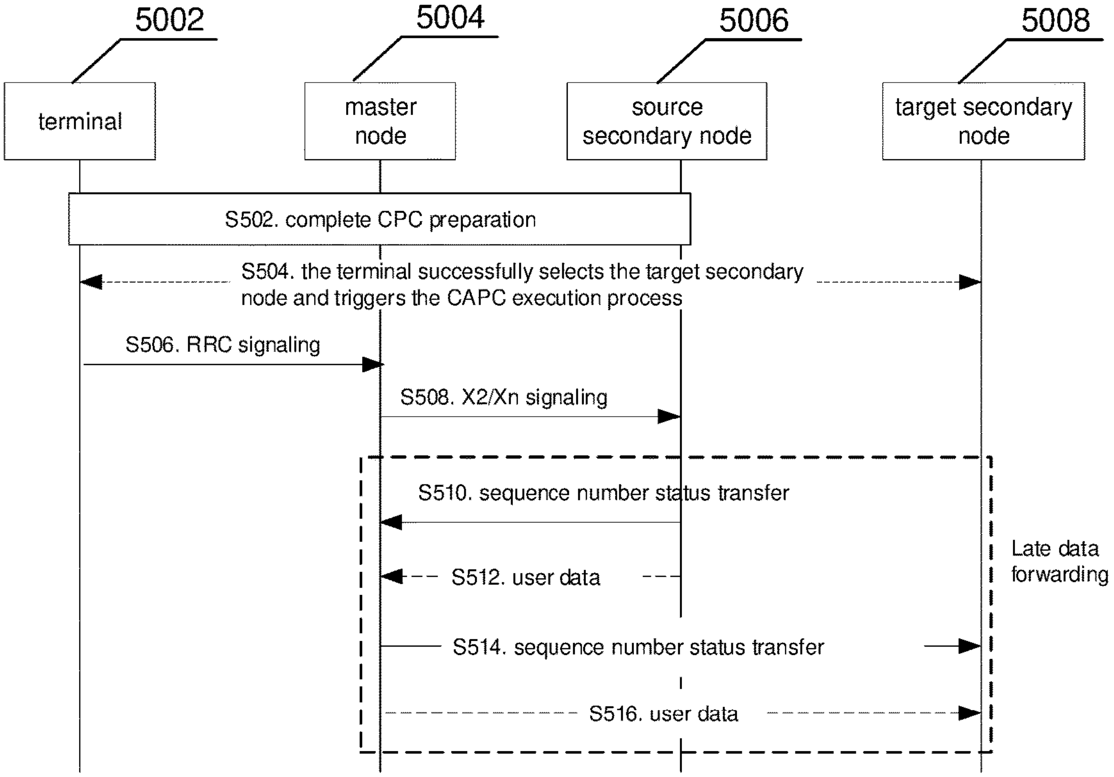
FIG. 5 is a schematic diagram of information interaction of a data forwarding process in a case of CPC shown in FIG. 4.

In some embodiments, for example, the MN can obtain a data forwarding address corresponding to the target cell from obtained data forwarding addresses according to the identification of the target cell obtained from the RRC signaling, and then send the data forwarding address together with the identification of the target cell as the information related to the CPC executed indication information to the source SN through the second preset signaling, so that the source SN simultaneously transmits the to-be-transmitted data corresponding to the terminal and the sequence number status transfer signaling corresponding to the to-be-transmitted data as well as the data forwarding address to the MN for data forwarding, wherein reference can be made to FIG. 4 and FIG. 5 for the specific implementation.

In other embodiments, for example, the MN can also only send the identification of the target cell as the information related to the CPC executed indication information to the source SN through the second preset signaling, and then after the source SN transmits the to-be-transmitted data corresponding to the terminal and the sequence number status transfer signaling corresponding to the to-be-transmitted data to the MN, obtain the data forwarding address corresponding to the target cell according to the identification of the target cell, to perform data forwarding.

According to the data transmission method provided in the embodiment of the present disclosure, by receiving first preset signaling comprising CPAC executed indication information used for indicating that a terminal has executed a CPAC process, which is sent by the terminal, and when the CPAC process is a conditional PScell change CPC process, sending, to a source secondary node, second preset signaling comprising CPC executed indication information used for indicating that the terminal has executed the CPC process, a late data forwarding procedure is started after an indication from a terminal to select a target secondary node is received, which makes the time for triggering the data forwarding procedure more proper, thereby avoiding the technical problem of UE data interruption or network cache overload that may be caused by an improper time for triggering data forwarding.

FIG. 2 is a flow diagram of another data transmission method shown according to an exemplary embodiment. The method shown in FIG. 2 is in a case of a CPA procedure, and can be applied, for example, to a master node in a dual connectivity network, which can be a master node in a 5G multi connectivity architecture network, for example.

Referring to FIG. 2, the method 20 provided in the embodiment of the present disclosure can comprise the following steps.

In step S202, first preset signaling comprising CPAC executed indication information used for indicating that a terminal has executed a CPAC process and information related to the CPAC executed indication information, which is sent by the terminal, is received, the information related to the CPAC executed indication information in the first preset signaling comprising an identification of a target cell of a target secondary node selected by the terminal in a CPA process.

In step S204, a data forwarding address corresponding to the target cell is obtained from obtained data forwarding addresses according to the identification of the target cell. When the network performs a CPA preparation process, in secondary node addition request acknowledge signaling fed back by each candidate target SN that is received by an MN, the data forwarding address can be included, which can be an Internet protocol (IP) address, for example.

In step S206, in response to receiving the first preset signaling, a late data forwarding procedure is triggered based on the CPAC executed indication information, and to-be-transmitted data corresponding to the terminal and Sequence number status transfer signaling corresponding to the to-be-transmitted data are sent to the target secondary node according to the data forwarding address corresponding to the target cell in the late data forwarding procedure.

FIG. 3 is a schematic diagram of information interaction of a data forwarding process in a case of CPA shown in FIG. 2. As shown in FIG. 3, first, the network completes a CPA preparation process (S302), including: a master node 3004 performing RRC reconfiguration on a terminal 3002 after receiving the secondary node addition request acknowledge signaling fed back by each candidate target SN; then the terminal 3002 selects a cell of a certain candidate target SN (e.g., a target secondary node 3006) as a PScell after screening indicators such as signal quality of surrounding cells, and the terminal 3002 immediately triggers the CAPC execution process to perform synchronization and random access processes to the target secondary node 3006 (S304). The terminal 3002, through RRC signaling, informs (S306) the master node 3004 of the CPAC having been executed, and through the RRC signaling, informs (S306) the master node 3004 of the identification (ID) of the target cell together. After receiving the RRC signaling, the master node 3004 directly starts a data forwarding procedure to forward the user data (S310) and the corresponding Sequence number status transfer signaling (S308) to the target secondary node 3006.

According to the data transmission method provided in the embodiment of the present disclosure, by combining the current CPA procedure, the UE indicates to the MN that the UE has selected the target SN through the newly added cell in the RRC signaling, so that the MN can forward the user data to the target secondary node at a proper time, and thus loss of the user data or increase in the base station cache load caused by an improper time for forwarding user data can be avoided.

FIG. 4 is a flow diagram of yet another data transmission method shown according to an exemplary embodiment. The method shown in FIG. 4 is in a case of a CPC procedure, and may be applied to, for example, a master node in a dual connectivity network, which can be a master node in a 5G multi connectivity architecture network, for example.

Referring to FIG. 4, the method 40 provided in the embodiment of the present disclosure can comprise the following steps.

In step S402, first preset signaling comprising CPAC executed indication information used for indicating that a terminal has executed a CPAC process and information related to the CPAC executed indication information, which is send by the terminal, is received, the information related to the CPAC executed indication information in the first preset signaling comprising an identification of a target cell of a target secondary node selected by the terminal in a CPC process.

In step S404, a data forwarding address corresponding to the target cell is obtained from obtained data forwarding addresses according to the identification of the target cell. When the network performs a CPC preparation process, in secondary node addition request acknowledge signaling fed back by each candidate target SN that is received by the MN, the data forwarding address can be included, which can be an Internet protocol (IP) address, for example.

In step S406, second preset signaling comprising CPC executed indication information used for indicating that the terminal has executed the CPC process and information related to the CPC executed indication information is sent to a source secondary node, the information related to the CPC executed indication information in the second preset signaling comprising the identification of the target cell and the data forwarding address corresponding to the target cell.

In step S408, to-be-transmitted data corresponding to the terminal and sequence number status transfer signaling corresponding to the to-be-transmitted data which are sent, in a late data forwarding procedure, by the source secondary node triggering the late data forwarding procedure based on the CPC executed indication information, as well as the data forwarding address corresponding to the target cell which is sent by the source secondary node based on the information related to the CPC executed indication information, are received. In the case of the CPC procedure, the late data forwarding procedure is triggered by the source secondary node, and the source secondary node receives the data forwarding address corresponding to the target cell through the second preset signaling, and thus can simultaneously transmit the data forwarding address, and the to-be-transmitted data and the sequence number status transfer signaling corresponding to the to-be-transmitted data to the master node in the late data forwarding procedure.

In step S410, the to-be-transmitted data and the Sequence number status transfer signaling corresponding to the to-be-transmitted data are sent to the target secondary node according to the data forwarding address corresponding to the target cell.

FIG. 5 is a schematic diagram of information interaction of a data forwarding process in a case of CPC shown in FIG. 4. As shown in FIG. 5, the network completes a CPC preparation process (S502), including: a master node 5004 performing RRC reconfiguration on a terminal 5002 after receiving the secondary node addition request acknowledge signaling fed back by each candidate target SN; then the terminal 5002 selects a cell of a certain candidate target SN (for example, a target secondary node 5008) as a PScell after screening indicators such as signal quality of surrounding cells, and the terminal 5002 immediately triggers a CAPC execution process, to perform synchronization and random access processes to the target secondary node 5008 (S504). The terminal 5002 can, through RRC signaling, inform (S506) the master node 5004 of the CPAC having been executed, and through the RRC signaling, inform (S506) the master node 5004 of the identification of the target cell together. After the master node 5004 receives the RRC information reported by the terminal 5002, the master node 5004 sends the indication information of the executed CPAC process to the source secondary node 5006 through an X2/Xn interface, and X2/Xn signaling can be newly added or existing Xn-U address indication signaling (i.e. the above second preset signaling) can be used, wherein reference can be made to the 3GPP protocol TS38.423/TS36.423 for the implementation related to the X2/Xn signaling; the master node 5004 simultaneously sends related information to the source secondary node 5006 through the newly added X2/Xn signaling or Xn-U address indication signaling (S508), the related information including the ID of the target cell and the data forwarding address, to indicate the source secondary node 5006 to start late data forwarding. After receiving the corresponding indication information of the master node 5004, the source secondary node 5006 sends the data (S512) that needs to be forwarded to the target secondary node 5008 and the corresponding Sequence number status transfer signaling (S510) to the master node 5004 (i.e., triggers the data forwarding procedure); and the master node 5004 sends the received user data (S516) and the corresponding Sequence number status transfer signaling (S514) to the target secondary node 5008.

According to the data transmission method provided in the embodiment of the present disclosure, by combining the existing CPC procedure and using the X2/Xn signaling, the connection status of the current UE at the network side is indicated in time, helping the source SN trigger the data forwarding procedure and start forwarding the user data and the user data status information, and meanwhile, the method can be well compatible with the existing protocol procedure, avoiding excessive signaling overhead.

Figure 6:
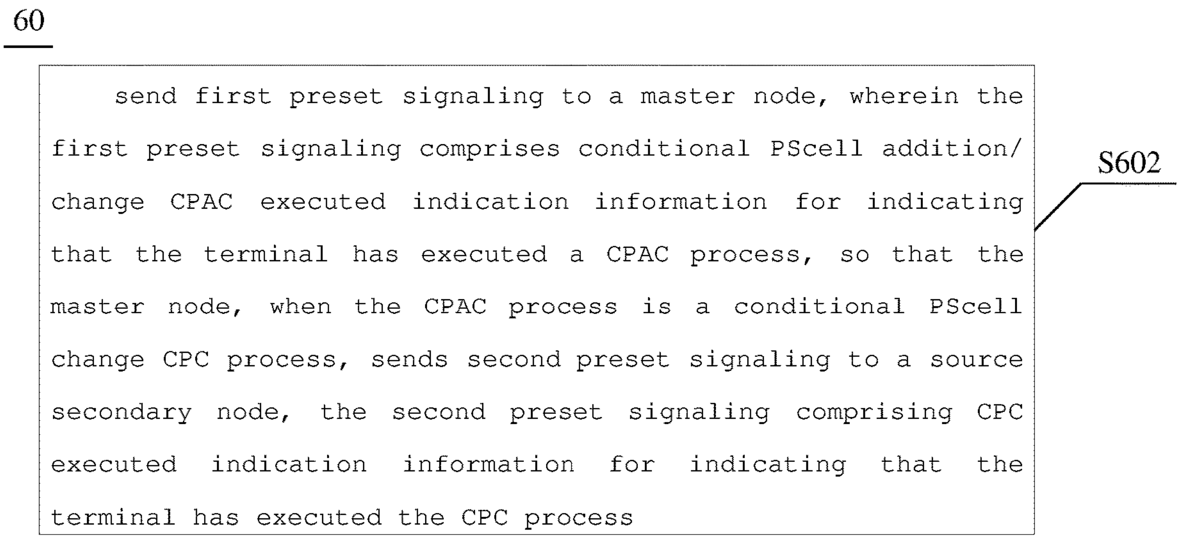
FIG. 6 shows a flow diagram of yet another data transmission method in an embodiment of the present disclosure.

FIG. 6 is a flow diagram of yet another data transmission method shown according to an exemplary embodiment. The method shown in FIG. 6 can be applied, for example, to a terminal in a dual connectivity network, which can be a terminal in a CPAC procedure, for example.

Referring to FIG. 6, the method 60 provided in the embodiment of the present disclosure can comprise the following steps.

In step S602, first preset signaling is sent to a master node, wherein the first preset signaling comprises conditional PScell addition/change CPAC executed indication information, wherein the CPAC executed indication information is used for indicating that the terminal has executed a CPAC process, so that the master node, when the CPAC process is a conditional PScell change (CPC) process, sends second preset signaling to a source secondary node, the second preset signaling comprising CPC executed indication information, and the CPC executed indication information being used for indicating that the terminal has executed the CPC process.

In some embodiments, the first preset signaling is RRC signaling.

In some embodiments, the second preset signaling is at least one of existing X2/Xn signaling, newly added X2 signaling, Xn-U address indication signaling, or newly added Xn signaling.

In some embodiments, the second preset signaling is the newly added X2 signaling, which is at least one of conditional PScell change notification signaling, conditional PScell change indication signaling, or conditional PScell change completion signaling.

In some embodiments, the second preset signaling is the newly added Xn signaling, which is at least one of conditional PScell change notification signaling, conditional PScell change indication signaling, or conditional PScell change completion signaling.

In some embodiments, the first preset signaling can further comprise information related to the CPAC executed indication information, the information related to the CPAC executed indication information in the first preset signaling comprising an identification of a target cell of a target secondary node selected by the terminal in the CPAC process. The second preset signaling can further comprise information related to the CPC executed indication information, the information related to the CPC executed indication information in the second preset signaling comprising the identification of the target cell and a data forwarding address corresponding to the target cell. The master node can obtain the data forwarding address corresponding to the target cell from obtained data forwarding addresses according to the identification of the target cell.

In some embodiments, the first preset signaling is ULInformationTransferMRDC signaling.

The data transmission method at the terminal side provided in the embodiment of the present disclosure corresponds to the data transmission method at the main base station side, so that reference can be made to FIG. 2 to FIG. 5 for the specific implementation, which is not repeated herein.

Figure 7:
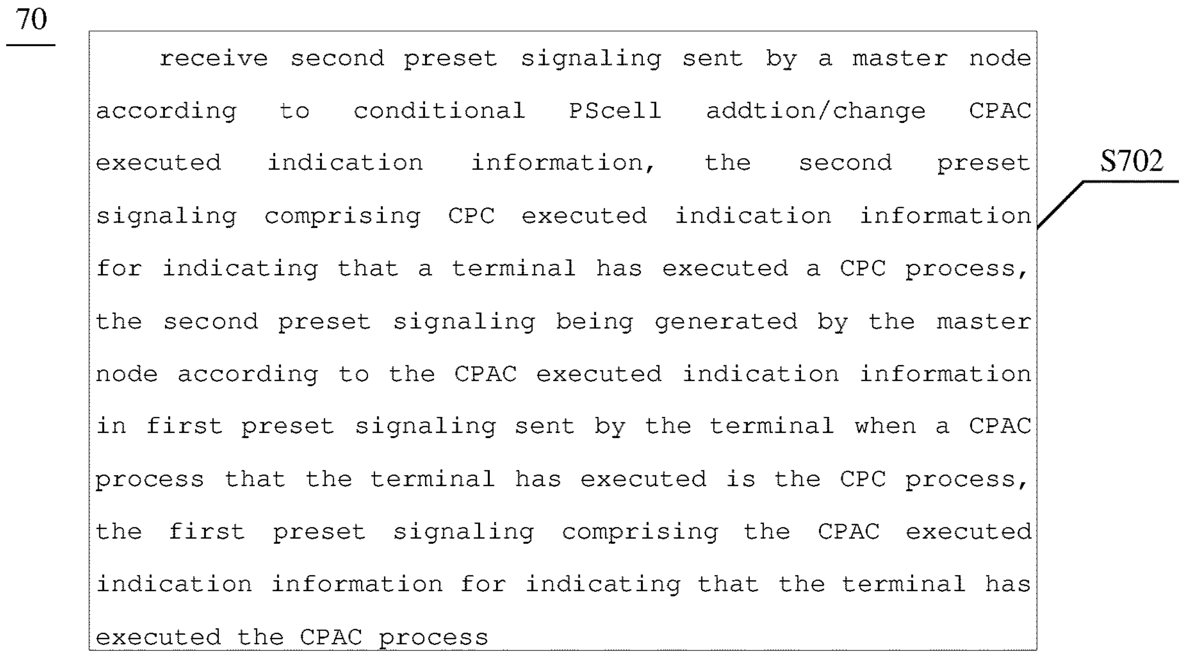
FIG. 7 shows a flow diagram of yet another data transmission method in an embodiment of the present disclosure.

FIG. 7 is a flow diagram of yet another data transmission method shown according to an exemplary embodiment. The method as shown in FIG. 7 can be applied, for example, to a secondary node in a dual connectivity network, which can be a source secondary node in a CPC procedure, for example.

Referring to FIG. 7, the method 70 provided in the embodiment of the present disclosure can comprise the following steps.

In step S702, second preset signaling sent by a master node according to conditional PScell addition/change CPAC executed indication information is received, the second preset signaling comprising CPC executed indication information, the CPC executed indication information being used for indicating that a terminal has executed a CPC process, the second preset signaling being generated by the master node according to the CPAC executed indication information in first preset signaling sent by the terminal when a conditional PScell addition/change (CPAC) process that the terminal has executed is the CPC process, the first preset signaling comprising the CPAC executed indication information, and the CPAC executed indication information being used for indicating that the terminal has executed the CPAC process.

In some embodiments, the first preset signaling is radio resource control (RRC) signaling.

In some embodiments, the second preset signaling is at least one of existing X2/Xn signaling, newly added X2 signaling, Xn-U address indication signaling, or newly added Xn signaling.

In some embodiments, the second preset signaling is the newly added X2 signaling, which is at least one of conditional PScell change notification signaling, conditional PScell change indication signaling, or conditional PScell change completion signaling.

In some embodiments, the second preset signaling is the newly added Xn signaling, which is at least one of conditional PScell change notification signaling, conditional PScell change indication signaling, or conditional PScell change completion signaling.

In some embodiments, the first preset signaling further comprises information related to the CPAC executed indication information, the information related to the CPAC executed indication information in the first preset signaling comprising an identification of a target cell of a target secondary node selected by the terminal in the CPAC process; and the second preset signaling comprises information related to the CPC executed indication information, the information related to the CPC executed indication information in the second preset signaling comprising the identification of the target cell and a data forwarding address corresponding to the target cell, and the data forwarding address corresponding to the target cell being obtained by the master node from obtained data forwarding addresses according to the identification of the target cell.

In some embodiments, a late data forwarding procedure is triggered based on the CPC executed indication information, and the source SN can send to-be-transmitted data corresponding to the terminal and Sequence number status transfer signaling corresponding to the to-be-transmitted data to the master node in the late data forwarding procedure, and send the data forwarding address corresponding to the target cell to the master node based on the information related to the CPC executed indication information, so that the master node sends the to-be-transmitted data and the Sequence number status transfer signaling corresponding to the to-be-transmitted data to the target secondary node according to the data forwarding address corresponding to the target cell.

In some embodiments, the first preset signaling is at least one of ULInformationTransferMRDC signaling, RRCReconfigurationComplete signaling, or RRCConnectionReconfigurationComplete signaling.

The data transmission method at the secondary base station side provided in the embodiment of the present disclosure corresponds to the data transmission method at the main base station side, so that reference can be made to FIG. 2 to 5 for the specific implementation, which is not repeated herein.

Figure 8:
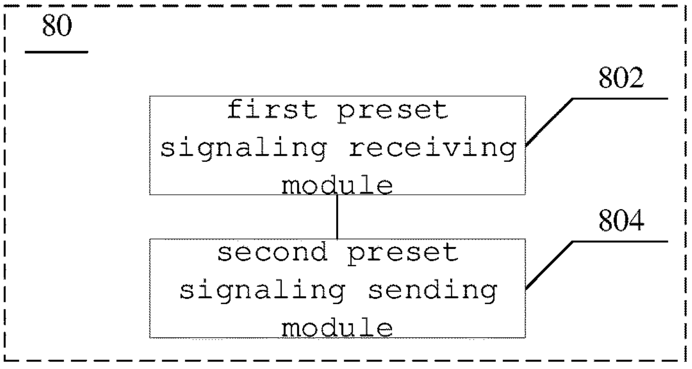
FIG. 8 shows a block diagram of a data transmission apparatus in an embodiment of the present disclosure.

FIG. 8 is a block diagram of a data transmission apparatus shown according to an exemplary embodiment. The apparatus shown in FIG. 8 can be applied, for example, to a master node in a dual connectivity network, which can be a master node in a 5G converged architecture network, for example.

Referring to FIG. 8, the apparatus 80 provided in the embodiment of the present disclosure can comprise a first preset signaling receiving module 802 and a second preset signaling sending module 804.

The first preset signaling receiving module 802 can be configured to receive first preset signaling sent by a terminal, wherein the first preset signaling comprises conditional PScell addition/change CPAC executed indication information, wherein the CPAC executed indication information is used for indicating that the terminal has executed a CPAC process.

The second preset signaling sending module 804 can be configured to, when the CPAC process is a conditional PScell change CPC process, send second preset signaling to a source secondary node, the second preset signaling comprising CPC executed indication information, and the CPC executed indication information being used for indicating that the terminal has executed the CPC process.

Figure 9:
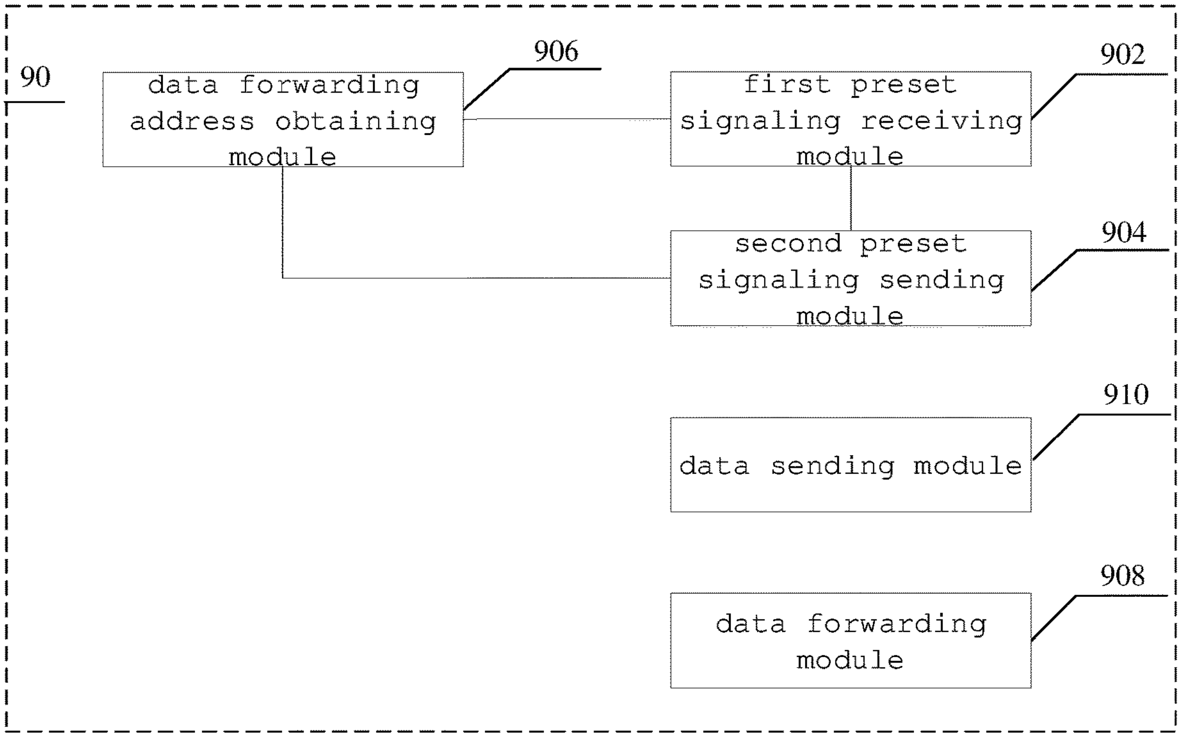
FIG. 9 shows a block diagram of another data transmission apparatus in an embodiment of the present disclosure.

FIG. 9 is a block diagram of another data transmission apparatus shown according to an exemplary embodiment. The apparatus shown in FIG. 9 can be applied, for example, to a master node in a dual connectivity network, which can be a master node in a 5G converged architecture network, for example.

Referring to FIG. 9, the apparatus 90 provided in the embodiment of the present disclosure can comprise a first preset signaling receiving module 902, a second preset signaling sending module 904, a data forwarding address obtaining module 906, a data forwarding module 908, and a data sending module 910.

The first preset signaling receiving module 902 can be configured to receive first preset signaling sent by a terminal, wherein the first preset signaling comprises conditional PScell addition/change CPAC executed indication information, wherein the CPAC executed indication information is used for indicating that the terminal has executed a CPAC process. The first preset signaling is radio resource control (RRC) signaling. The first preset signaling can be at least one of ULInformationTransferMRDC signaling, RRCReconfigurationComplete signaling, or RRCConnectionReconfigurationComplete signaling. The first preset signaling further comprises information related to the CPAC executed indication information, and the information related to the CPAC executed indication information in the first preset signaling can comprise an identification of a target cell of a target secondary node selected by the terminal in the CPAC process.

The data forwarding address obtaining module 906 can be configured to obtain a data forwarding address corresponding to the target cell from obtained data forwarding addresses according to the identification of the target cell.

The second preset signaling sending module 904 can be configured to, when the CPAC process is a conditional PScell change CPC process, send second preset signaling to a source secondary node, wherein the second preset signaling can comprise CPC executed indication information and information related to the CPC executed indication information, the CPC executed indication information being used for indicating that the terminal has executed the CPC process, and the information related to the CPC executed indication information in the second preset signaling comprising the identification of the target cell and the data forwarding address corresponding to the target cell. The second preset signaling can be at least one of newly added X2 signaling, Xn-U address indication signaling, or newly added Xn signaling. The second preset signaling can be the newly added X2 signaling, which is at least one of conditional PScell change notification signaling, conditional PScell change indication signaling, or conditional PScell change completion signaling. The second preset signaling can be the newly added Xn signaling, which is at least one of conditional PScell change notification signaling, conditional PScell change indication signaling, or conditional PScell change completion signaling.

The data forwarding module 908 can be configured to receive to-be-transmitted data corresponding to the terminal and Sequence number status transfer signaling corresponding to the to-be-transmitted data which are sent, in a late data forwarding procedure, by the source secondary node triggering the late data forwarding procedure based on the CPC executed indication information, as well as the data forwarding address corresponding to the target cell which is sent by the source secondary node based on the information related to the CPC executed indication information; and send the to-be-transmitted data and the Sequence number status transfer signaling corresponding to the to-be-transmitted data to the target secondary node according to the data forwarding address corresponding to the target cell.

The data sending module 910 can be configured to, in response to receiving the first preset signaling, trigger a late data forwarding procedure based on the CPAC executed indication information, and send the to-be-transmitted data corresponding to the terminal and the Sequence number status transfer signaling corresponding to the to-be-transmitted data to the target secondary node according to the data forwarding address corresponding to the target cell in the late data forwarding procedure.

Figure 10:
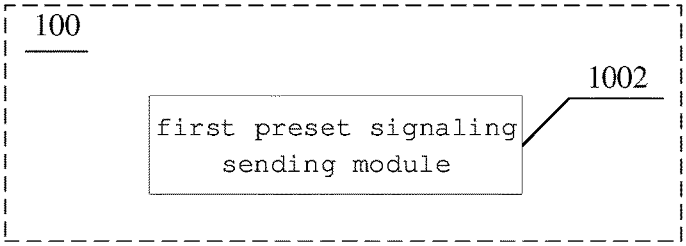
FIG. 10 shows a block diagram of a further data transmission apparatus in an embodiment of the present disclosure.

FIG. 10 is a block diagram of yet another data transmission apparatus shown according to an exemplary embodiment. The apparatus shown in FIG. 10 can be applied, for example, to a terminal in a dual connectivity network, which can be a terminal in a 5G converged architecture network, for example.

Referring to FIG. 10, the apparatus 100 provided in the embodiment of the present disclosure can comprise a first preset signaling sending module 1002.

The first preset signaling sending module 1002 can be configured to send first preset signaling to a master node, wherein the first preset signaling comprises conditional PScell addition/change CPAC executed indication information, the CPAC executed indication information being used for indicating that the terminal has executed a CPAC process, so that the master node, when the CPAC process is a conditional PScell change CPC process, sends second preset signaling to a source secondary node, the second preset signaling comprising CPC executed indication information, and the CPC executed indication information being used for indicating that the terminal has executed the CPC process.

The first preset signaling can be radio resource control (RRC) signaling.

The first preset signaling can be at least one of ULInformationTransferMRDC signaling, RRCReconfigurationComplete signaling, or RRCConnectionReconfigurationComplete signaling.

The second preset signaling can be at least one of newly added X2 signaling, Xn-U address indication signaling, or newly added Xn signaling.

The second preset signaling can be the newly added X2 signaling, which is at least one of conditional PScell change notification signaling, conditional PScell change indication signaling, or conditional PScell change completion signaling.

The second preset signaling can be the newly added Xn signaling, which is at least one of conditional PScell change notification signaling, conditional PScell change indication signaling, or conditional PScell change completion signaling.

The first preset signaling can further comprise information related to the CPAC executed indication information, the information related to the CPAC executed indication information in the first preset signaling comprising an identification of a target cell of a target secondary node selected by the terminal in the CPAC process.

The first preset signaling sending module 1002 can be further configured to send the first preset signaling to the master node, so that the master node obtains a data forwarding address corresponding to the target cell from obtained data forwarding addresses according to the identification of the target cell; and the second preset signaling can further comprise information related to the CPC executed indication information, the information related to the CPC executed indication information in the second preset signaling comprising the identification of the target cell and the data forwarding address corresponding to the target cell.

Figure 11:
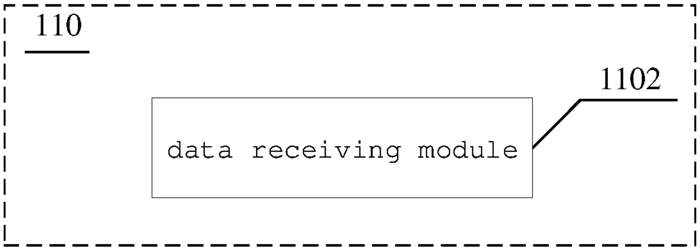
FIG. 11 shows a block diagram of yet another data transmission apparatus in an embodiment of the present disclosure.

FIG. 11 is a block diagram of yet another data transmission apparatus shown according to an exemplary embodiment. The apparatus shown in FIG. 11 can be applied, for example, to a secondary node in a dual connectivity network, which can be a target secondary node in a 5G converged architecture network, for example.

Referring to FIG. 11, the apparatus 110 provided in the embodiment of the present disclosure can comprise a data receiving module 1102.

The data receiving module 1102 can be configured to receive to-be-transmitted data and Sequence number status transfer signaling corresponding to the to-be-transmitted data sent by a master node to a target secondary node according to a data forwarding address corresponding to a target cell.

Figure 12:
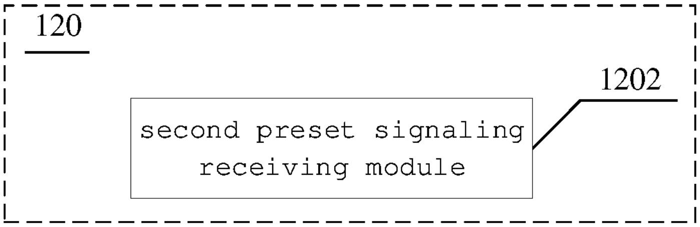
FIG. 12 shows a block diagram of yet another data transmission apparatus in an embodiment of the present disclosure.

FIG. 12 is a block diagram of yet another data transmission apparatus shown according to an exemplary embodiment. The apparatus shown in FIG. 12 can be applied, for example, to a secondary node in a dual connectivity network, which can be a source secondary node in a 5G converged architecture network, for example.

Referring to FIG. 12, the apparatus 120 provided in the embodiment of the present disclosure can comprise a second preset signaling receiving module 1202.

The second preset signaling receiving module 1202 can be configured to receive second preset signaling sent by a master node according to conditional PScell addition/change CPAC executed indication information, the second preset signaling comprising CPC executed indication information, the CPC executed indication information being used for indicating that a terminal has executed a CPC process, the second preset signaling being generated by the master node according to the CPAC executed indication information in first preset signaling sent by the terminal when a conditional PScell addition/change CPAC process that the terminal has executed is the CPC process, the first preset signaling comprising the CPAC executed indication information, and the CPAC executed indication information being used for indicating that the terminal has executed the CPAC process.

Figure 13:
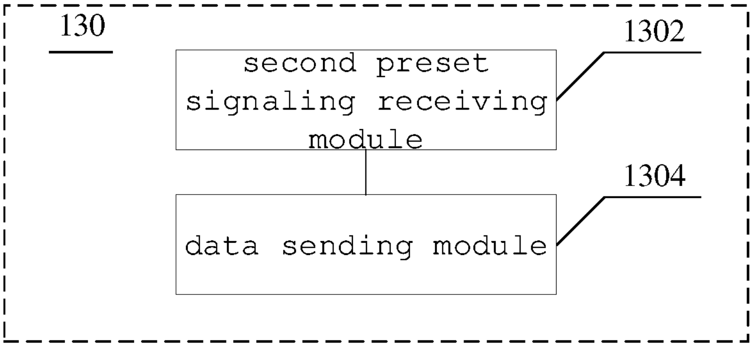
FIG. 13 shows a block diagram of yet another data transmission apparatus in an embodiment of the present disclosure.

FIG. 13 is a block diagram of yet another data transmission apparatus shown according to an exemplary embodiment. The apparatus shown in FIG. 13 can be applied, for example, to a secondary node in a dual-connectivity network, which can be a secondary node in a 5G converged architecture network, for example.

Referring to FIG. 13, the apparatus 130 provided in the embodiment of the present disclosure can comprise a second preset signaling receiving module 1302 and a data sending module 1304.

The second preset signaling receiving module 1302 can be configured to receive second preset signaling sent by a master node according to conditional PScell addition/change CPAC executed indication information, the second preset signaling comprising CPC executed indication information, the CPC executed indication information being used for indicating that a terminal has executed a CPC process, the second preset signaling being generated by the master node according to the CPAC executed indication information in first preset signaling sent by the terminal when a conditional PScell addition/change CPAC process that the terminal has executed is the CPC process, the first preset signaling comprising the CPAC executed indication information, and the CPAC executed indication information being used for indicating that the terminal has executed the CPAC process.

The first preset signaling can be RRC signaling.

The first preset signaling can be at least one of ULInformationTransferMRDC signaling, RRCReconfigurationComplete signaling, or RRCConnectionReconfigurationComplete signaling.

The second preset signaling can be at least one of newly added X2 signaling, Xn-U address indication signaling, or newly added Xn signaling.

The second preset signaling can be the newly added X2 signaling, which is at least one of conditional PScell change notification signaling, conditional PScell change indication signaling, or conditional PScell change completion signaling.

The second preset signaling is the existing X2/Xn signaling, or newly added Xn signaling, which is at least one of conditional PScell change notification signaling, conditional PScell change indication signaling, or conditional PScell change completion signaling.

The first preset signaling can further comprise information related to the CPAC executed indication information, wherein the information related to the CPAC executed indication information in the first preset signaling can comprise an identification of a target cell of a target secondary node selected by the terminal in the CPAC process; and the second preset signaling can comprise information related to the CPC executed indication information, wherein the information related to CPC executed indication information in the second preset signaling can comprise the identification of the target cell and a data forwarding address corresponding to the target cell, the data forwarding address corresponding to the target cell being obtained by the master node from obtained data forwarding addresses according to the identification of the target cell.

The data sending module 1304 can be configured to trigger a late data forwarding procedure based on the CPC executed indication information, send to-be-transmitted data corresponding to the terminal and Sequence number status transfer signaling corresponding to the to-be-transmitted data to the master node in the late data forwarding procedure, and send the data forwarding address corresponding to the target cell to the master node based on the information related to the CPC executed indication information, so that the master node sends the to-be-transmitted data and the Sequence number status transfer signaling corresponding to the to-be-transmitted data to the target secondary node according to the data forwarding address corresponding to the target cell.

Reference can be made to the content in the above method for the specific implementation of each module in the apparatus provided in the embodiment of the present disclosure, which is not repeated herein.

Figure 14:
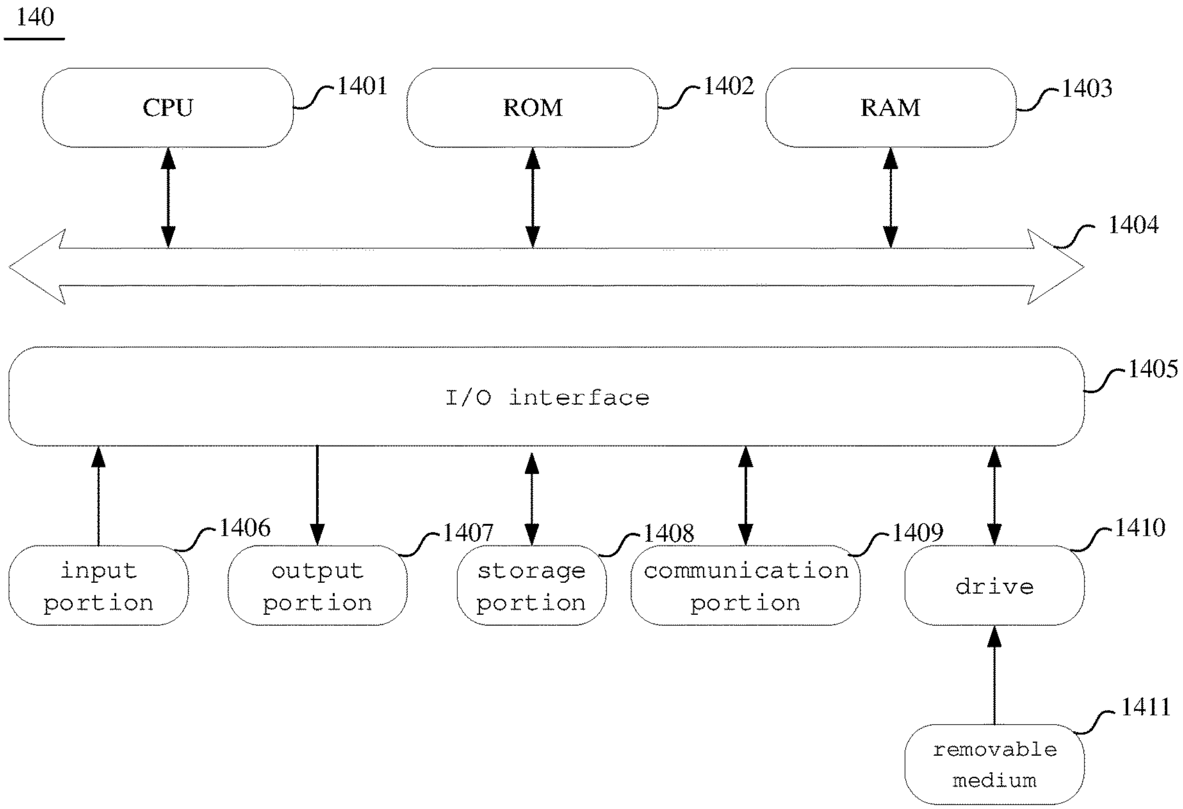
FIG. 14 shows a schematic structural diagram of an electronic device in an embodiment of the present disclosure.

FIG. 14 shows a schematic structural diagram of an electronic device in an embodiment of the present disclosure. It should be noted that the device shown in FIG. 14 is only an example of a computer system, and should not bring any limitation to the function and the use scope of the embodiment of the present disclosure.

As shown in FIG. 14, the device 140 includes a central processing unit (CPU) 1401, which can perform various appropriate actions and processes according to a program stored in a read-only memory (ROM) 1402 or a program loaded from a storage portion 1408 into a random access memory (RAM) 1403. In the RAM 1403, various programs and data necessary for the operation of the device 140 are also stored. The CPU 1401, ROM 1402, and RAM 1403 are connected to each other via a bus 1404. An input/output (I/O) interface 1405 is also connected to the bus 1404.

The following components are connected to the I/O interface 1405: an input portion 1406 including a keyboard, a mouse, and the like; an output portion 1407 including a cathode ray tube (CRT), a liquid crystal display (LCD), and the like, and a speaker and the like; the storage portion 1408 including a hard disk and the like; and a communication portion 1409 including a network interface card such as a LAN card and a modem. The communication portion 1409 performs communication processing via a network such as the Internet. A drive 1410 is also connected to the I/O interface 1405 as needed. A removable medium 1411, such as a magnetic disk, an optical disk, a magneto-optical disk, and a semiconductor memory, is mounted on the drive 1410 as needed, so that a computer program read out therefrom is installed into the storage portion 1408 as needed.

In particular, according to the embodiments of the present disclosure, the processes described above with reference to the flow diagrams can be implemented as a computer software program. For example, the embodiments of the present disclosure include a computer program product, the computer program product comprising a computer program carried on a computer-readable medium, the computer program containing program code for performing the method illustrated by the flow diagrams. In such an embodiment, the computer program can be downloaded from a network via the communication portion 1409 and installed, and/or installed from the removable medium 1411. The above functions defined in the system of the present disclosure are executed when the computer program is executed by the central processing unit (CPU) 1401.

It should be noted that the computer-readable medium shown in the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: radio, a wire, an optical cable, RF (Radio Frequency), etc., or any suitable combination of the foregoing.

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or part of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved modules described in the embodiments of the present disclosure may be implemented by software or hardware. The described modules may also be provided in a processor, which may be described, for example, as: a processor comprising a first preset signaling receiving module and a second preset signaling sending module. The names of these modules do not form a limitation on the modules themselves in some cases, for example, the first preset signaling receiving module may also be described as "a module that receives first preset signaling from a terminal".

As another aspect, the present disclosure also provides a computer-readable medium, which may be contained in the device described in the above embodiments; or may exist separately without being assembled into the device. The above computer-readable medium has thereon carried one or more programs which, when executed by the device, cause the device to: receive first preset signaling sent by a terminal, wherein the first preset signaling comprises conditional PScell addition/change CPAC executed indication information, wherein the CPAC executed indication information is used for indicating that the terminal has executed a CPAC process; and when the CPAC process is a conditional PScell change CPC process, send second preset signaling to a source secondary node, the second preset signaling comprising CPC executed indication information, and the CPC executed indication information being used for indicating that the terminal has executed the CPC process.

Figure 15:
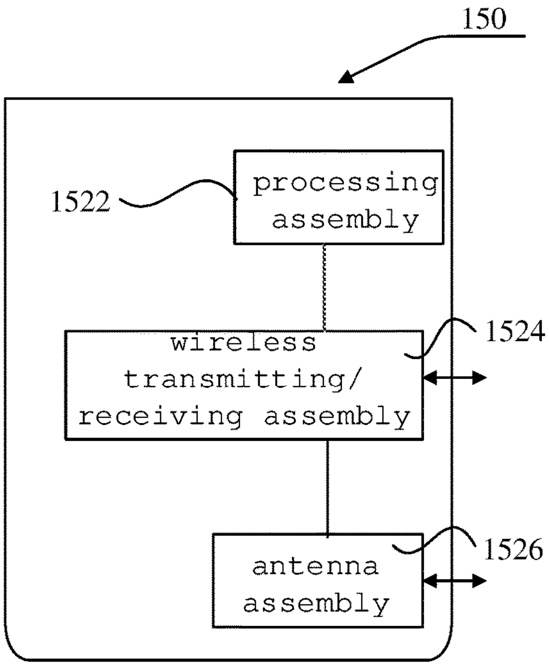
FIG. 15 is a schematic structural diagram showing a data transmission apparatus according to an exemplary embodiment.

As shown in FIG. 15, FIG. 15 is a schematic structural diagram of a data transmission apparatus 150 shown according to an exemplary embodiment. The apparatus 150 can be provided as a base station. Referring to FIG. 15, the apparatus 150 comprises a processing assembly 1522, a wireless transmitting/receiving assembly 1524, an antenna assembly 1526, and a signal processing portion specific to a wireless interface, wherein the processing assembly 1522 can further comprise one or more processors.

One of the processors in the processing assembly 1522 can be configured to: receive first preset signaling sent by a terminal, wherein the first preset signaling comprises conditional PScell addition/change CPAC executed indication information, wherein the CPAC executed indication information is used for indicating that the terminal has executed a CPAC process; and when the CPAC process is a conditional PScell change CPC process, send second preset signaling to a source secondary node, the second preset signaling comprising CPC executed indication information, and the CPC executed indication information being used for indicating that the terminal has executed the CPC process.

Exemplary embodiments of the present disclosure are specifically illustrated and described above. It is to be understood that the present disclosure is not limited to the detailed structure, arrangements, or implementations described herein; on the contrary, the present disclosure is intended to cover various modifications and equivalent arrangements included within the spirit and scope of the appended claims.

What is claimed is:

1. A data transmission method applied to a master node, comprising:

receiving first preset signaling sent from a terminal, wherein the first preset signaling simultaneously comprises conditional PScell addition/change (CPAC) executed indication information for indicating that the terminal has executed a CPAC process, and information related to the CPAC executed indication information, comprising an identification of a target cell of a target secondary node selected by the terminal in the CPAC process;

obtaining a data forwarding address corresponding to the target cell from obtained data forwarding addresses according to the identification of the target cell;

sending second preset signaling to a source secondary node in a case that the CPAC process is a conditional PScell change (CPC) process, wherein the second preset signaling simultaneously comprises CPC executed indication information for indicating that the terminal has executed the CPC process, and information related to the CPC executed indication information, comprising the identification of the target cell and the data forwarding address corresponding to the target cell;

simultaneously receiving to-be-transmitted data corresponding to the terminal and sequence number status transfer signaling corresponding to the to-be-transmitted data which are sent, in a late data forwarding procedure, from the source secondary node triggering the late data forwarding procedure based on the CPC executed indication information, as well as the data forwarding address corresponding to the target cell which is sent from the source secondary node based on the information related to the CPC executed indication information; and sending the to-be-transmitted data and the sequence number status transfer signaling corresponding to the to-be-transmitted data to the target secondary node according to the data forwarding address corresponding to the target cell.

2. The data transmission method according to claim 1, wherein the first preset signaling is radio resource control (RRC) signaling.

3. The data transmission method according to claim 1, wherein the second preset signaling is at least one of existing X2/Xn signaling, newly added X2 signaling, Xn-U address indication signaling, or newly added Xn signaling.

4. The data transmission method according to claim 3, wherein the second preset signaling is the newly added X2 signaling, which is at least one of conditional PScell change notification signaling, conditional PScell change indication signaling, or conditional PScell change completion signaling.

5. The data transmission method according to claim 3, wherein the second preset signaling is the newly added Xn signaling, which is at least one of conditional PScell change notification signaling, conditional PScell change indication signaling, or conditional PScell change completion signaling.

6. The data transmission method according to claim 1, wherein the first preset signaling is at least one of multiple radio access technologies double connection signaling of uplink information transfer, radio resource control reconfiguration completion signaling, or radio resource control connection reconfiguration completion signaling.

7. A device, comprising: a memory, a processor, and executable instructions stored in the memory and executable in the processor, wherein the processor, when executing the executable instructions, implements the method according to claim 1.

8. A non-transitory computer-readable storage medium stored computer-executable instructions, wherein the executable instructions, when executed by a processor, implement the method according to claim 1.

9. A data transmission method applied to a terminal, comprising:

sending first preset signaling to a master node, wherein the first preset signaling simultaneously comprises conditional PScell addition/change (CPAC) executed indication information for indicating that the terminal has executed a CPAC process, and information related to the CPAC executed indication information, comprising an identification of a target cell of a target secondary node selected by the terminal in the CPAC process, so that the master node, obtains a data forwarding address corresponding to the target cell from obtained data forwarding addresses according to the identification of the target cell; in a case that the CPAC process is a conditional PScell change CPC process, sends second preset signaling to a source secondary node, wherein the second preset signaling simultaneously comprises CPC executed indication information for indicating that the terminal has executed the CPC process, and information related to the CPC executed indication information, comprising the identification of the target cell and the data forwarding address corresponding to the target cell; simultaneously receives to-be-transmitted data corresponding to the terminal and sequence number status transfer signaling corresponding to the to-be-transmitted data which are sent, in a late data forwarding procedure, from the source secondary node triggering the late data forwarding procedure based on the CPC executed indication information, as well as the data forwarding address corresponding to the target cell which is sent from the source secondary node based on the information related to the CPC executed indication information; and sends the to-be-transmitted data and the sequence number status transfer signaling corresponding to the to-be-transmitted data to the target secondary node according to the data forwarding address corresponding to the target cell.

10. A data transmission method applied to a secondary node, comprising:

receiving second preset signaling sent from a master node according to conditional PScell addition/change (CPAC) executed indication information, wherein: the second preset signaling simultaneously comprises conditional PScell change (CPC) executed indication information for indicating that a terminal has executed a CPC process, and information related to the CPC executed indication information, comprising an identification of a target cell and data forwarding address corresponding to the target cell, and the second preset signaling is generated by the master node according to the CPAC executed indication information in first preset signaling sent by the terminal in a case that a conditional PScell addition/change (CPAC) process that the terminal has executed is the CPC process, the first preset signaling simultaneously comprising the CPAC executed indication information for indicating that the terminal has executed the CPAC process, and information related to the CPAC executed indication information, comprising an identification of a target cell of a target secondary node selected by the terminal in the CPAC process;

triggering a late data forwarding procedure based on the CPC executed indication information, sending to-be-transmitted data corresponding to the terminal and sequence number status transfer signaling corresponding to the to-be-transmitted data in the late data forwarding procedure, sending the data forwarding address corresponding to the target cell based on the information related to the CPC executed indication information, so that the master node sends the to-be-transmitted data and the sequence number status transfer signaling corresponding to the to-be-transmitted data to the target secondary node according to the data forwarding address corresponding to the target cell.

* * * * *